(12) United States Patent
Wang et al.

(10) Patent No.: US 9,352,224 B2
(45) Date of Patent: May 31, 2016

(54) GATHERING PATH DATA FROM A MASSIVELY MULTIPLAYER ON-LINE ROLE-PLAYING GAME

(75) Inventors: Xiaodong Wang, Xi'an (CN); Jun Fang, Xi'an (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 514 days.

(21) Appl. No.: 13/499,746

(22) PCT Filed: Oct. 11, 2011

(86) PCT No.: PCT/US2011/055808
§ 371 (c)(1),
(2), (4) Date: Apr. 2, 2012

(87) PCT Pub. No.: WO2013/055320
PCT Pub. Date: Apr. 18, 2013

(65) Prior Publication Data
US 2013/0090167 A1    Apr. 11, 2013

(51) Int. Cl.
*A63F 13/12* (2006.01)
*A63F 13/30* (2014.01)
*G06N 3/00* (2006.01)

(52) U.S. Cl.
CPC ............. *A63F 13/12* (2013.01); *G06N 3/006* (2013.01); *A63F 2300/535* (2013.01); *A63F 2300/646* (2013.01); *A63F 2300/69* (2013.01); *A63F 2300/807* (2013.01)

(58) Field of Classification Search
CPC ....................................................... A63F 13/12
USPC ............................................................ 463/31
See application file for complete search history.

(56) References Cited

U.S. PATENT DOCUMENTS

| 4,862,373 | A  | * | 8/1989 | Meng ............................. 701/423 |
| 6,525,736 | B1 | * | 2/2003 | Erikawa .................. A63F 13/10 |
|           |    |   |        | 345/473 |
| 6,529,210 | B1 |   | 3/2003 | Rees |
| 6,736,724 | B1 | * | 5/2004 | Erikawa .................. A63F 13/10 |
|           |    |   |        | 463/1 |
| 7,129,951 | B2 |   | 10/2006 | Stelly, III |
| 2002/0045470 | A1 | * | 4/2002 | Atsumi et al. ..................... 463/1 |
| 2004/0209684 | A1 | * | 10/2004 | Hisano ............................ 463/32 |
| 2005/0248570 | A1 |   | 11/2005 | Stelly, III |
| 2005/0264576 | A1 |   | 12/2005 | Sommers |

(Continued)

FOREIGN PATENT DOCUMENTS

CN    101145995 A    3/2008
CN    102306386 A    1/2012

OTHER PUBLICATIONS

Barnden, J.A. et al, On the connectionist implementation of analogy and working memory matching, Advances in Connectionist and Neural Computation Theory, 1994, pp. 327-374, vol. 3: Analogy, Metaphor and Reminding, Ablex Publishing Corp, Norwood, N.J., USA.

(Continued)

*Primary Examiner* — David L Lewis
*Assistant Examiner* — Shauna-Kay Hall
(74) *Attorney, Agent, or Firm* — Brundidge & Stanger, P.C.

(57) ABSTRACT

Technologies are generally disclosed for gathering path data from a massively multiplayer on-line role-playing game to determine a path through a mapping plane that may be a real-world or virtual-world representation.

22 Claims, 7 Drawing Sheets

(56) References Cited

U.S. PATENT DOCUMENTS

| | | | | |
|---|---|---|---|---|
| 2006/0135237 | A1* | 6/2006 | Tsuda | 463/9 |
| 2006/0246974 | A1* | 11/2006 | Tsuda | A63F 13/10 463/7 |
| 2006/0258448 | A1* | 11/2006 | Ishibashi | A63F 13/10 463/31 |
| 2007/0198178 | A1* | 8/2007 | Trimby et al. | 701/209 |
| 2010/0091018 | A1 | 4/2010 | Tatarchuk et al. | |
| 2010/0141666 | A1 | 6/2010 | Christopher et al. | |
| 2010/0306717 | A1* | 12/2010 | Yamada et al. | 715/863 |

OTHER PUBLICATIONS

Isard, M., et al., Quincy: Fair scheduling for distributed computing clusters, In Proceedings of 22nd ACM Symposium on Operating Systems Principles (SOSP '09), Oct. 2009, Big Sky, Montana.

Wang, G., et al., A simulation approach to evaluating design decisions in mapreduce setups, In Proceedings of the 17th International Symposium on Modelling, Analysis and Simulation of Computer and Telecommunication Systems (MASCOTS 2009), Sep. 2009, London, UK.

Reyes, Eumir P., A systems thinking approach to business intelligence based on cloud computing, Master of Science in Engineering and Management Thesis, Feb. 2010, MIT.

Tenenbaum, J., et al., A global geometric framework for nonlinear dimensionality reduction, Science, 290, pp. 2319-2323.

Roweis, S. T., et al., Nonlinear dimensionality reduction by locally linear embedding, Science, 290, pp. 2323-2326.

Nae, Vlad, et al., The impact of virtualization on the performance of Massively Multiplayer Online Games, NetGames 2009, Proceedings of the 8th Annual Workshop on Network and Systems Support for Games, Article 9, 6 pages, IEEE Press, Piscataway, NJ.

Bharambe, A.R., et al., Mercury: a scalable publish-subscribe system for internet games, NETGAMES '02: Proceedings of the 1st workshop on Network and system support for games, pp. 3-9, New York, NY, USA, 2002, ACM Press.

Iosup, Alexandru, et al., The impact of virtualization on the performance and operational costs of massively multiplayer online games, 2009, Int. J. Adv. Media and Comput., vol. x, No. x, xxxx, pp. 1-20.

United States Patent and Trademark Office, International Search Report and Written Opinion of the International Searching Authority for PCT/US2011/055808, mailed on Jan. 31, 2012.

* cited by examiner

800 A computer program product.

802 A signal bearing medium.

804 instructions for a gathering path data from a massively multiplayer on-line role-playing game, which, when executed by logic, cause the logic to:

map one or more virtual points on a mapping plane, each of the one or more virtual points to assert a repulsive force upon an object moved from a first area of the mapping plane to a second area of the mapping plane;

incorporate the mapping plane in a scene for the massively multiplayer on-line role-playing game, wherein the one or more mapped virtual points are separately decorated to fit one or more aspects of the scene;

gather path data responsive to individual players of the massively multiplayer on-line role-playing game moving their respective object through the scene from the first area of the mapping plane to the second area of the mapping plane; or     determine a minimum repulsive force path through the mapping plane based, at least in part, on the gathered path data.

| 806 a computer readable medium. | 808 a recordable medium. | 810 a communications medium. |

GATHERING PATH DATA FROM A MASSIVELY MULTIPLAYER ON-LINE ROLE-PLAYING GAME

CROSS REFERENCE TO RELATED APPLICATIONS

This application is the National Stage filing under 35 U.S.C. §371 of PCT Application Ser. No. PCT/US11/55808 filed on Oct. 11, 2011.

BACKGROUND

Unless otherwise indicated herein, the approaches described in this section are not prior art to the claims in this application and are not admitted to be prior art by inclusion in this section.

Cloud computing to include large collections of computing hardware and associated software is an important technological development. Cloud computing may seamlessly or transparently integrate these large collections of computing hardware and associated software to provide information technology and software services. Cloud computing may enable end-users to exploit supercomputer-like power on-demand without the need to make large investments in infrastructure and management costs. An example type of service provided by cloud computing may include clustering or classification computing of pattern recognition. Classification computing of pattern recognition may include machine learning, which requires large amounts of costly machine computing resources to implement. Even with the use of cloud computing, classification computing of pattern recognition that includes machine learning may still be prohibitively costly to end-users.

SUMMARY

In various embodiments, the present disclosure describes example methods for gathering path data from a massively multiplayer on-line role-playing game. The methods may include mapping one or more virtual points on a mapping plane. Each of the one or more virtual points may assert a repulsive force upon an object moved from a first area of the mapping plane to a second area of the mapping plane. The mapping plane may then be incorporated in a scene for the massively multiplayer on-line role-playing game. In some examples, the one or more mapped virtual points may be separately decorated to fit one or more aspects of the scene. Also, path data may be gathered responsive to individual players of the massively multiplayer on-line role-playing game moving their respective object through the scene from the first area of the mapping plane to the second area of the mapping plane. A minimum repulsive force path through the mapping plane may then be determined based, at least in part, on the gathered path data.

In various embodiments, the present disclosure also describes example devices for gathering path data from a massively multiplayer on-line role-playing game. The example devices may have a path manager that has logic. The logic may be configured to map one or more virtual points on a mapping plane. Each of the one or more virtual points may assert a repulsive force upon an object moved from a first area of the mapping plane to a second area of the mapping plane. The logic may also be configured to incorporate the mapping plane in a scene for the massively multiplayer on-line role-playing game. In some examples, the one or more mapped virtual points may be separately decorated to fit one or more aspects of the scene. The logic may also be configured to gather path data responsive to individual players of the massively multiplayer on-line role-playing game moving their respective object through the scene from the first area of the mapping plane to the second area of the mapping plane. The logic may also be configured to determine a minimum repulsive force path through the mapping plane based, at least in part, on the gathered path data.

In various embodiments, the present disclosure also describes example systems for gathering path data from a massively multiplayer on-line role-playing game. The example systems may include one or more servers to host the massively multiplayer on-line role-playing game. The example system may also include a path manager. The path manager may have logic configured to map one or more virtual points on a mapping plane. Each of the one or more virtual points may assert a repulsive force upon an object moved from a first area of the mapping plane to a second area of the mapping plane. The logic may also be configured to incorporate the mapping plane in a scene for the massively multiplayer on-line role-playing game. In some examples, the one or more mapped virtual points may be separately decorated to fit one or more aspects of the scene. The logic may also be configured to gather path data responsive to individual players of the massively multiplayer on-line role-playing game moving their respective object through the scene from the first area of the mapping plane to the second area of the mapping plane. The logic may also be configured to determine a minimum repulsive force path through the mapping plane based, at least in part, on the gathered path data.

In various embodiments, the present disclosure also describes example computer program products. In some examples, the computer program products may include a signal bearing medium having instructions for gathering path data from a massively multiplayer on-line role-playing game. The instructions, which, when executed by logic may cause the logic to map one or more virtual points on a mapping plane. Each of the one or more virtual points may assert a repulsive force upon an object moved from a first area of the mapping plane to a second area of the mapping plane. The instructions may also cause the logic to incorporate the mapping plane in a scene for the massively multiplayer on-line role-playing game. In some examples, the one or more mapped virtual points are separately decorated to fit one or more aspects of the scene. The instructions may also cause the logic to gather path data responsive to individual players of the massively multiplayer on-line role-playing game moving their respective object through the scene from the first area of the mapping plane to the second area of the mapping plane. The instruction may also cause the logic to determine a minimum repulsive force path through the mapping plane based, at least in part, on the gathered path data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products for gathering path data from a massively multiplayer on-line role-playing game to determine a path through a mapping plane that may be a real-world or virtual-world representation.

As contemplated in the present disclosure, even with the use of cloud computing, clustering or classification computing of pattern recognition that includes machine learning may still be prohibitively costly to end-users. Further, machine learning or artificial intelligence by itself may not be powerful enough or realistically cost effective for an end-user to reach a level of humanity in regards to clustering or classification computing of pattern recognition. In some examples, humanity intelligent resources in a cloud computing environment may provide an alternative to clustering or classification computing of pattern recognition that includes primarily machine learning. Humanity intelligent resources may be game players participating or involved in a massively multiplayer on-line role-player game (MMORG). Large numbers of game players may use human intelligence to augment clustering or classification computing of pattern recognition that includes machine learning.

In some examples, methods are implemented for gathering path data from an MMORG. The methods may include mapping one or more virtual points on a mapping plane. Each of the one or more virtual points may assert a repulsive force upon an object moved from a first area of the mapping plane to a second area of the mapping plane. The mapping plane may then be incorporated in a scene for the MMORG. In some examples, the one or more mapped virtual points may be separately decorated to fit one or more aspects of the scene. Also, path data may be gathered responsive to individual players of the MMORG moving their respective object through the scene from the first area of the mapping plane to the second area of the mapping plane. A minimum repulsive force path through the mapping plane may then be determined based, at least in part, on the gathered path data.

Figure 1:
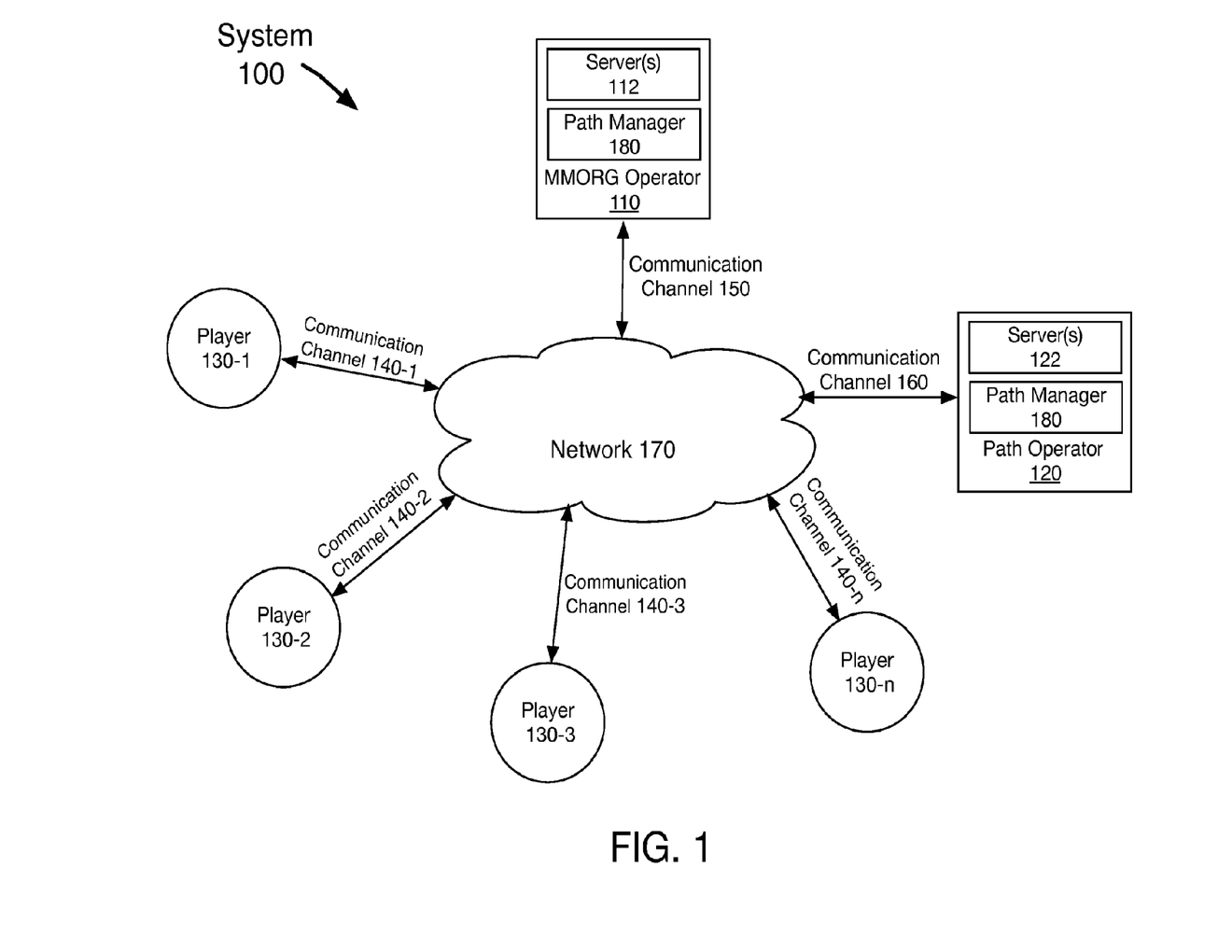
FIG. 1 illustrates an example system for gathering path data.

FIG. 1 illustrates an example system 100 for gathering path data, arranged in accordance with at least some embodiments of the present disclosure. As shown in FIG. 1, system 100 includes an MMORG operator 110, a path operator 120, players 130-1 to 130-n, and a network 170. In some examples, as shown in FIG. 1, communication channels 140-1 to 140-n, and communication channels 150, 160 may communicatively couple players 130-1 to 103-n, MMORG operator 110 and path operator 120, respectively, to network 170. Network 170 may be a communication medium such as the Internet to interconnect players 130-1 to 103-n, MMORG operator 110 and path operator 120. Also, in some examples, as shown in FIG. 1, MMORG operator 110 and path operator 120 may separately include a path manager 180. As described in more detail below, path manager 180 may include logic and/or features configured to gather path data from an MMORG and determine a path through a mapping plane that may be a real-world or virtual-world representation (e.g., a building layout or a geographical layout).

Also, as shown in FIG. 1, MMORG operator 110 includes server(s) 112. In some examples, server(s) 112 may be computing resources configured to host an MMORG involving a multitude of players 130-1 to 130-n (where "n" represents an integer>3). For these examples, players 130-1 to 130-n may connect to or go on-line through network 170 (e.g., the Internet) to participate in the MMORG. As described in more detail below, path manager 180 at MMORG operator 110 may include logic and/or features configured to gather path data from the MMORG. The path data may be gathered responsive to individual players 130-1 to 130-n separately moving an object (e.g., a role-player) through one or more scenes in the MMORG. The object may be moved through a mapping plane incorporated in the one or more scenes. The mapping plane, for example, may include one or more virtual points, which assert repulsive forces to inhibit a player's efforts to move their object from one area of the mapping plane to another. Also, logic and/or features of path manager 180 at MMORG operator 110 may be configured to determine a minimum repulsive force path through the mapping plane based, at least in part, on path data gathered from players 130-1 to 130-n moving their respective objects through the mapping plane.

In some examples, as shown in FIG. 1, path operator 120 includes server(s) 122. For these examples, server(s) 122 may be computing resources configured to host one or more scenes for an MMORG that may be primarily hosted by servers(s) 112 at MMORG operator 110. For example, players 130-1 to 130-n may be redirected from server(s) 112 through network 170 to one or more scenes hosted by server(s) 122 at path operator 120. For these examples, path manager 180 at MMORG operator 110 may include logic and/or features configured to gather path data from the one or more scenes of the MMORG hosted by server(s) 122. The path data may be gathered responsive to individual players 130-1 to 130-n separately moving an object (e.g., a role-player) through the one or more scenes in the MMORG hosted by server(s) 122. The object may be moved through a mapping plane incorporated in the one or more scenes. The mapping plane, for example, may include one or more virtual points, which assert repulsive forces to inhibit a player's efforts to move their object from one area of the mapping plane to another. Also, logic and/or features of path manager 180 at path operator 120 may be configured to determine a minimum repulsive force path through the mapping plane based, at least in part, on path data gathered from players 130-1 to 130-n moving their respective objects through the mapping plane.

According to some examples, communication channels 140-1 to 140-n, or communication channels 150, 160 may operate in accordance with one or more wired or wireless standards that enable MMORG operator 110, path operator 120 or players 130-1 to 130-n to communicatively couple to and through network 170. These wired or wireless standards may be described in one or one or more industry standards such as those associated with IEEE 802.1, IEEE 802.11, IEEE 802.16, GSM, GPRS, EDGE, W-CDMA, HSPA, CDMA-2000, EV-DO, LTE or TD-LTE. Although this disclosure is not limited to only the above-mentioned wired or wireless standards.

Figure 2:
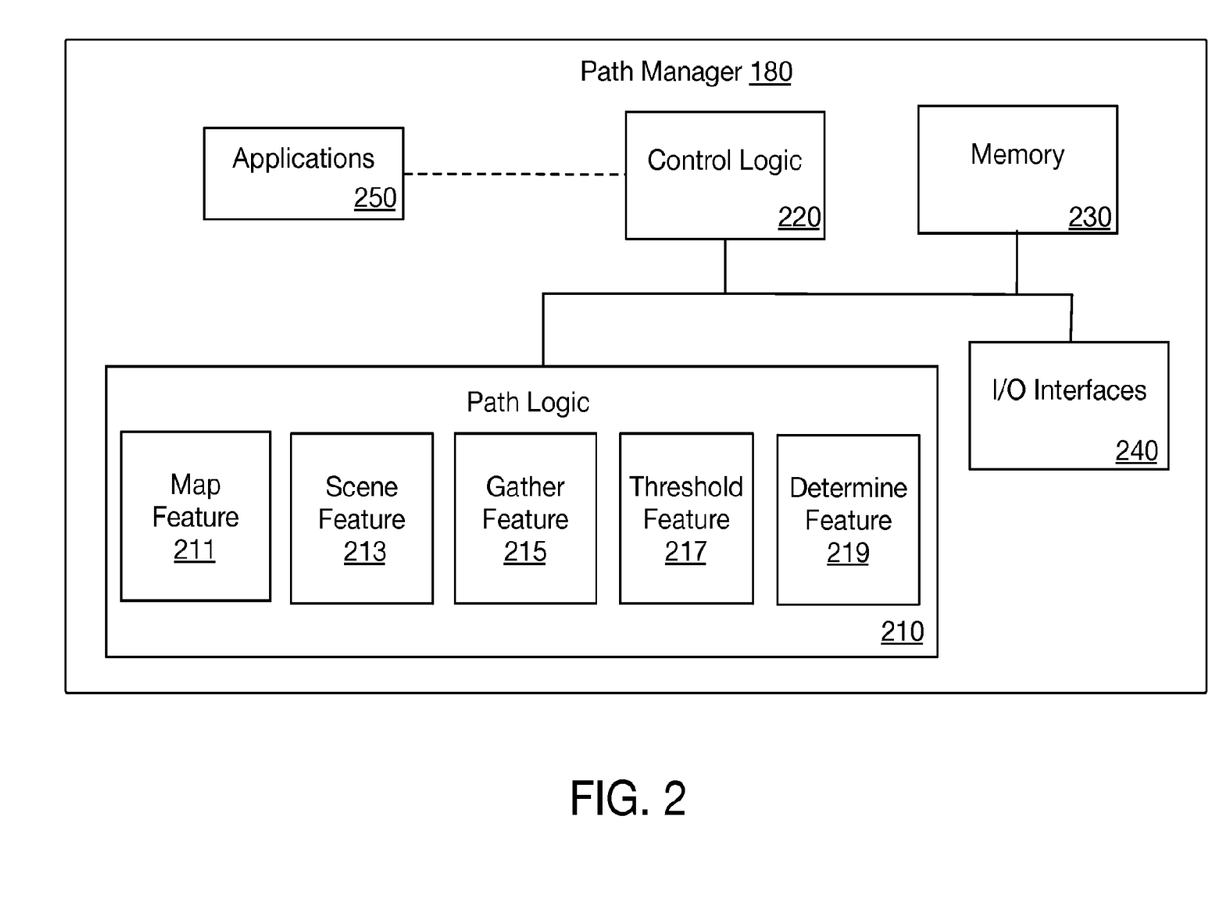
FIG. 2 illustrates a block diagram of an example architecture for a path manager.

FIG. 2 illustrates a block diagram of an example architecture for path manager 180, arranged in accordance with at least some embodiments of the present disclosure. As described above for system 100 in FIG. 1, MMORG operator 110 and/or path operator 120 may include path manager 180. In some examples, path manager 180 includes features and/or logic configured or arranged to gather path data from an MMORG and determine a path through a mapping plane that may be a real-world or virtual-world representation.

The example path manager 180 of FIG. 2, includes path logic 210, control logic 220, a memory 230, input/output (I/O) interfaces 240 and optionally one or more applications 250. As illustrated in FIG. 2, path logic 210 may be coupled to control logic 220, memory 230 and I/O interfaces 240. Also illustrated in FIG. 2, optional applications 250 may be arranged in cooperation with control logic 220. Path logic 210 may further include one or more of a map feature 211, a scene feature 213, a gather feature 215, a threshold feature 217, or a determine feature 219, or any reasonable combination thereof.

In some examples, the elements portrayed in FIG. 2's block diagram are configured to support or enable path manager 180 as described in this disclosure. A given path manager 180 may include some, all or more elements than those depicted in FIG. 2. For example, path logic 210 and control logic 220 may separately or collectively represent a wide variety of logic device(s) to implement the features of path manager 180. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, path logic 210 includes one or more of a map feature 211, a scene feature 213, a gather feature 215, a threshold feature 217, or a determine feature 219. Path logic 210 may be configured to use one or more of these features to perform operations. As described in more detail below, example operations may include gathering path data from an MMORG to determine a path through a mapping plane.

In some examples, control logic 220 may be configured to control the overall operation of path manager 180. As mentioned above, control logic 220 may represent any of a wide variety of logic device(s) configured to operate in conjunction with executable content or instructions to implement the control of path manager 180. In some alternate examples, the features and functionality of control logic 220 may be implemented within path logic 210.

According to some examples, memory 230 is arranged to store executable content or instructions. The executable content or instructions may be used by control logic 220 and/or path logic 210 to implement or activate features or elements of path manager 180. As described more below, memory 230 may also be arranged to temporarily maintain information associated with mapping virtual points in a mapping plane, incorporating the mapped virtual points in a scene for an MMORG and gathering path data from the scene to determine a minimum repulsive force through the mapping plane.

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an local wired and/or wireless communication medium or link between path manager 180 and elements resident on or located with MMORG operator 110 (e.g., server(s) 112) or path operator 120 (e.g., server(s) 122). I/O interfaces 240 may include interfaces that operate according to various communication protocols to communicate over the local wired or wireless communication medium or link (e.g., I$^2$C, SMBus, SPI, PCI-Express, USB, IEEE 802.1, IEEE 802.11, IEEE 802.16, etc). I/O interfaces 240 may also provide an interface between path manager 180 and elements located remote to MMORG operator 110 or path operator 120. For example, as mentioned above for FIG. 1, MMORG operator 110 having path manager 180 may communicatively couple to players 130-1 to 130-n via communication channel 150 through network 170. Also, path operator 120 having path manager 180 may communicatively couple to players 130-1 to 130-n via communication channel 160 through network 170. I/O interfaces 240, for example, include an interface configured to operate according to various wired or wireless communication protocols to allow path manager 180 at either MMORG operator 110 or path operator 120 to communicate over communication channel 150 and 160, respectively. These wired or wireless communication protocols may include, but are not limited to, IEEE 802.1, IEEE 802.11, IEEE 802.16, GSM, GPRS, EDGE, W-CDMA, HSPA, CDMA-2000, EV-DO, LTE, TD-LTE.

In some examples, path manager 180 includes one or more applications 250 to provide instructions to control logic 220 and/or path logic 210. These instructions, for example, may include instructions for path manager 180 to implement or use one or more of map feature 211, scene feature 213, gather feature 215, threshold feature 217, or determine feature 219.

Figure 3:
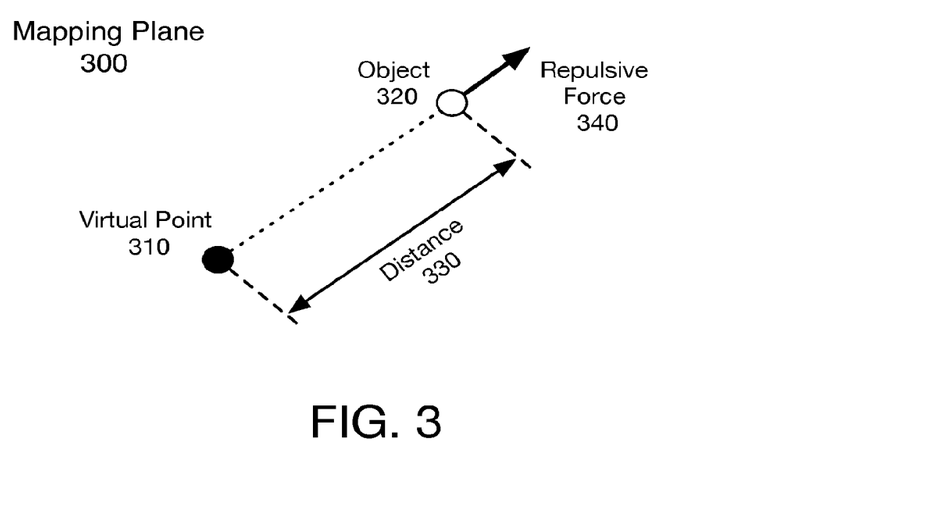
FIG. 3 illustrates a diagram of an example mapping plane.

FIG. 3 illustrates a diagram of an example mapping plane 300, arranged in accordance with at least some embodiments of the present disclosure. As shown in FIG. 3, mapping plane 300 includes a virtual point 310 and an object 320 separated by a distance 330. The virtual point 310 may be mapped from a sample of clustering or classification method. In some examples, as shown in FIG. 3, a repulsive force 340 may be asserted or applied on object 320 by virtual point 310. The repulsive strength of repulsive force 340, in some examples, may decrease as a distance value associated with distance 330 increases. Thus, for example, to minimize the effects of repulsive force 340, object 320 may be moved from a first portion of mapping plane 300 to a second portion of mapping plane 300 such that a maximum distance is maintained.

In some examples, a mapping plane, such as mapping plane 300, may be a real-world or virtual-world representation. A real-world representation may include, but is not limited to, a building layout, a community layout, a city layout, an assembly line layout, a topographical map, a battlefield map, a city street map, a regional freight route map, a national freight route map, an international freight route map, a communication network map, a cloud computing network, or any combinations thereof. A virtual-world representation may include, but is not limited to, a building layout, a forest layout, an ocean layout, a desert layout, a mountain layout, a battlefield map, a community/village layout, a city layout, a city street map, or any combinations thereof.

According to some examples where mapping plane 300 may be a real-world representation, object 320 may represent a physical entity. For example, object 320 may represent a person, a vehicle, a ship, an animal, an electrical signal, etc. For these examples, virtual point 310 may represent items in the real-world that may inhibit the movement of the physical entity as the physical entity is moved from a physical location associated with a first area of mapping plane 300 to another physical location associated with a second area of mapping plane 300. For example, object 320 may represent a person and mapping plane 300 may be a community layout. Virtual point 310 may assert a repulsive force such as a barrier or obstacle that inhibits or slows down the person's movement from one part of the community to another part of the community.

Figure 4:
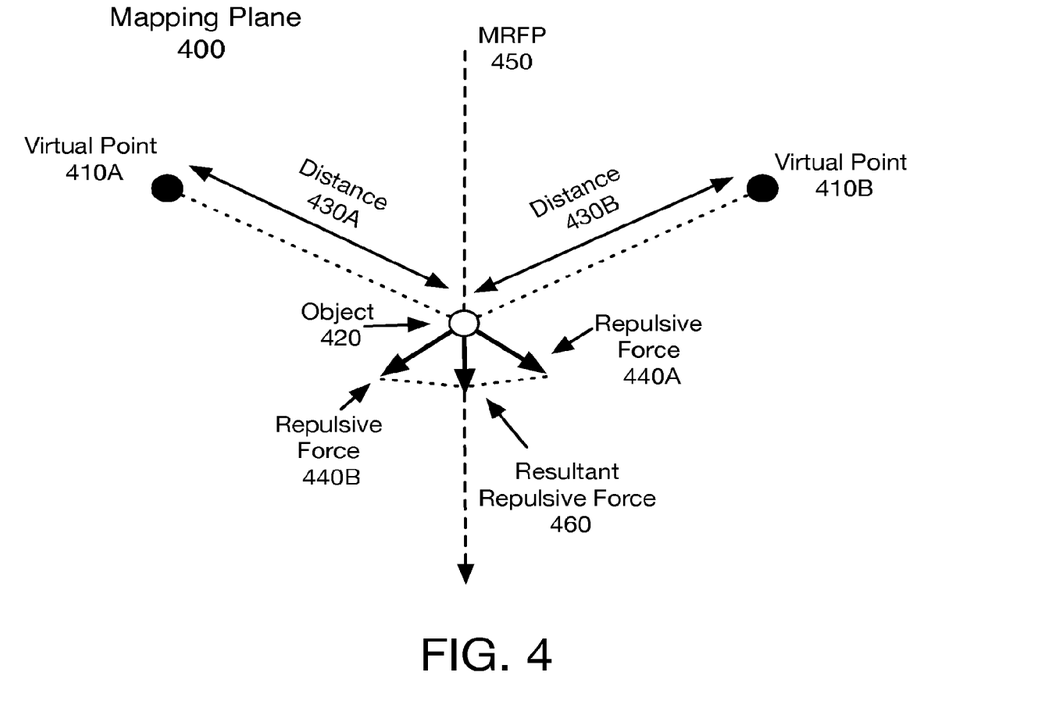
FIG. 4 illustrates a diagram of another example mapping plane.

FIG. 4 illustrates a diagram of another example mapping plane 400, arranged in accordance with at least some embodiments of the present disclosure. As shown in FIG. 4, mapping plane includes virtual points 410A and 410B and an object 420. Object 420 is also shown as being a distance 430A from a virtual point 410A and a distance 430B from a virtual point 410B. In some examples, as shown in FIG. 4, repulsive forces 440A and 440B may be asserted or applied on object 420 by virtual points 410A and 410B, respectively. Also, a resultant repulsive force 460, as shown in FIG. 4, shows the total or summation of repulsive forces 440A and 440B on object 420. In some examples, resultant repulsive force 460 may change as object 420 or virtual points 410A, 410B move to different positions of mapping plane 400.

In some examples, similar to what was mentioned above for repulsive force 340 for FIG. 3, the repulsive strengths of repulsive forces 440A and 440B, may decrease as distance values associated with distance 430A and/or distance 430B increase. Thus, for an example where virtual points 410A and 410B assert equal repulsive forces on object 420, the effects of repulsive force applied by 440A and/or repulsive force applied by 440B may be minimized when object 420 is moved from a first portion of mapping plane 400 to a second portion of mapping plane 400 such that a maximum distance between both repulsive forces is maintained. That maximum distance may follow a path identified as minimum repulsive force path (MRFP) 450 in FIG. 4.

In some examples, virtual points 410A and 410B may be mapped to mapping plane 400. The mapping of virtual points 410A and 410B may be based on either a 2-dimensional or 3-dimensional mapping plane. For an example of a 2-dimensional mapping plane, virtual points 410A and 410B may be included among a multitude of virtual points that may be mapped to mapping plane 400. The multitude of virtual points may compose a point set $P=\{p^1, \ldots, p^j, \ldots, p^m\}$, where point $p^j$, indicates an ordinary point on mapping plane 400. Also, j is an integer and $1 \le j \le m$. So for a 2-dimensional mapping plane, let $(x_j, y_j)$ denote the coordinates of $p^j$ in the 2-dimensional mapping plane. Example equation (1) may be used to calculate the value of $x_j, y_j$.

$$x_j = \alpha_1 * attbi_1^j; y_j = \alpha_2 * attbi_2^j, \tag{1}$$

For example equation (1), $\alpha_1$, $\alpha_2$ are weights and $attb_1^j$, $attbi_2^j$ are attributes associated with the virtual point mapped at $p^j$. In some examples, $attbi_1^j$, $attbi_2^j$ may be associated with certain attributes of the virtual point such as a type of structure or geographical feature (e.g., a tree, a building, a depression/hole, bushes rocks, water, grass, sand, etc.). For example, $attbi_1^j$ may be an attribute for a given virtual point in the x direction and $attbi_2^j$ may be another attribute for the given virtual point in the y direction of mapping plane 400. For the virtual point set P, which number of attributes exceeds 2 or 3, dimensionality reduction algorithms will be used so as to fit the points to 2-dimensional or 3-dimensional plane. Also, $\alpha_1$ may be a weight associated with a size of $attbi_1^j$ for the given virtual point in the x direction of mapping plane 400 and $\alpha_2$ may be a weight associated with a size of $attbi_2^j$ for the given virtual point in the y direction of mapping plane 400. For example, if the attribute was a body of water, a larger body of water may have a larger weight value associated with $\alpha_1$ or $\alpha_2$ in the x and y directions, respectively.

According to some examples, a value may be associated with an amount of repulsive force (e.g., repulsive force 440A) that a virtual point (e.g., virtual point 410A) located at $p^j$ may assert on an object (e.g., object 420) at a given location on mapping plane 400. Example equation (2) depicts a way to show the value as related to how the repulsive force may change as the distance between the object and source of the repulsive force changes.

$$\vec{f_p^j} = \vec{F_c}/d \tag{2}$$

For example equation (2), $\vec{f_p^j}$ represents the value associated with the amount of repulsive force asserted by a virtual point at $p^j$ and $\vec{F_c}$ represents the unit repulsive force asserted by a virtual point. $\vec{F_c}$ is a constant with a default value, it can be set by users. Also, for example equation (2), d represents the distance the object is from the virtual point at $p^j$. Thus, when d equals to zero, $\vec{F_c}$ will be $\infty$.

In some examples, repulsive forces asserted in total on an object for all virtual points mapped to a mapping plane may be determined for a given point/coordinate of a mapping plane. Example equation (3) may depict a way to show the resultant total repulsive force from a multitude of virtual points located at various points in mapping plane 400.

$$\vec{F_{res}} = \sum_{p_j \in P} \vec{f_p^j} \tag{3}$$

For example equation (3), $\vec{F_{res}}$ represents the resultant force and equates to a summation of total repulsive force asserted by virtual points located at various points of point set P. In some examples, as shown in FIG. 4, MRFP 450 shows an anticipated path the player may move object 420 in order to minimize the amount of $\vec{F_{res}}$ 460. So, in some examples, if a player of an MMORG wants to rapidly move object 420 from one portion of mapping plane 400 to another portion of mapping plane, the player may move object 420 in such a way as to minimize the amount of repulsive force asserted by virtual points 410A and 410B.

Figure 5:
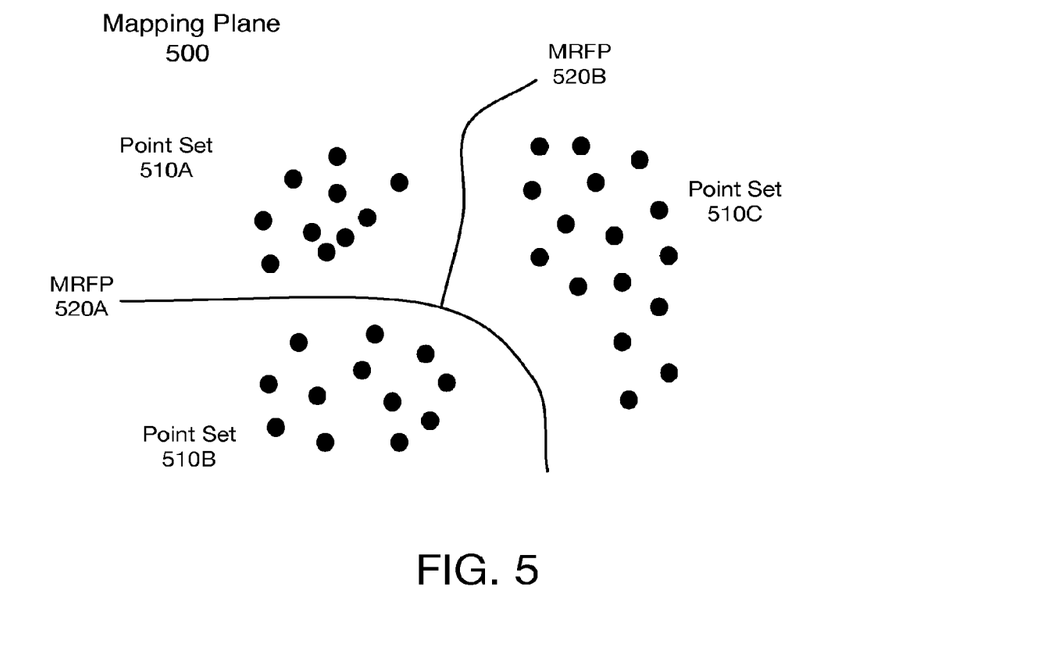
FIG. 5 illustrates an example diagram of minimum repulsive force paths through a mapping plane.

FIG. 5 illustrates an example diagram of minimum repulsive force paths through a mapping plane, arranged in accordance with at least some embodiments of the present disclosure. In some examples, point sets may be divided and clustered on a mapping plane 500 as shown in FIG. 5. The point sets are depicted in FIG. 5 as point sets 510A-C. Also, for these examples, MRFPs 520A-C may indicate anticipated minimum repulsive force paths an object may be moved from one portion of mapping plane 500 to another portion of mapping plane 500.

According to some examples, point set 510A may represent a cluster of virtual points. For example, point set 510A may represent a forest while point set 510B may represent a grouping of buildings and point set 510C may represent a swamp or concentration of water features. A player of an MMORG may move an object along any of the MRFPs 520A-B to minimize repulsive forces asserted by the various virtual points depicted in FIG. 5.

Figure 6:
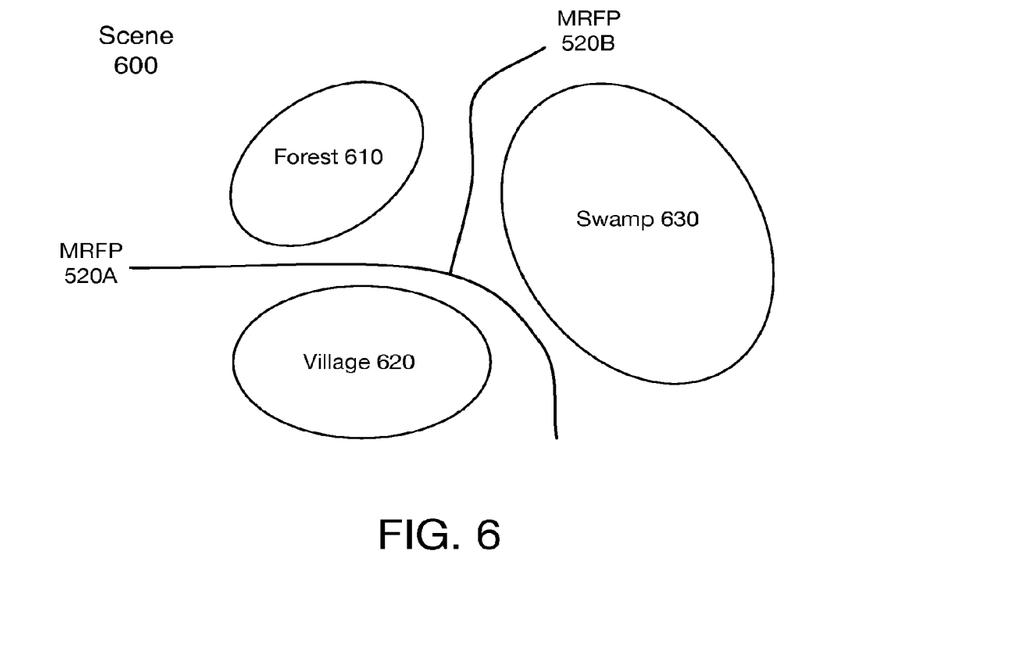
FIG. 6 illustrates an example scene that incorporates a mapping plane having virtual points decorated to fit the scene.

FIG. 6 illustrates an example scene that incorporates a mapping plane having virtual points decorated to fit the scene, arranged in accordance with at least some embodiments of the present disclosure. In some examples, as shown in FIG. 6, a forest 610, a village 620 and a swamp 630 may be representations of point sets 510A-C that have been decorated or dressed up to fit a scene of an MMORG. For these examples, players of the MMORG may see individual virtual points from point set 510A as trees or antagonists (e.g., wild animals or hostile forces) that may be included in the forest. The players may also see various virtual points from point set 510B as buildings, houses or antagonists in a village or hostile inhabitants of the village. Further, players of the MMORG may also see virtual points from point set 510C as water features such as bogs, swamps or antagonists included in the swamp.

Figure 7:
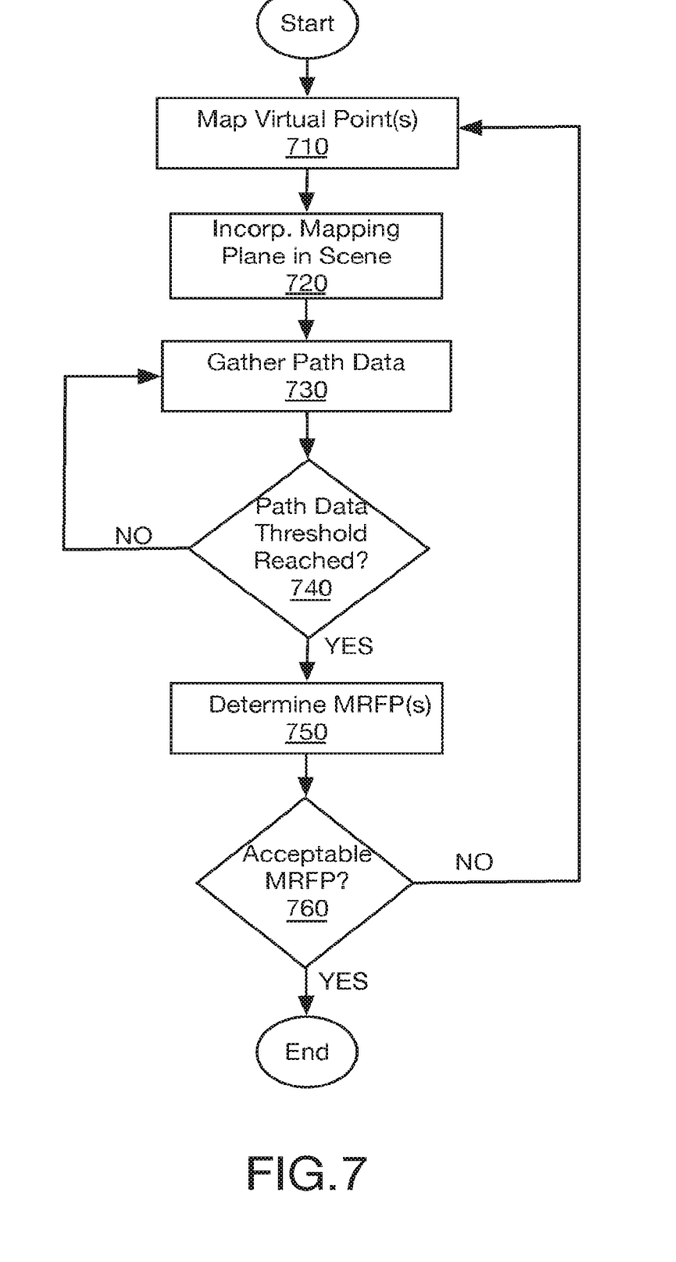
FIG. 7 illustrates a flow chart of example methods for gathering path data.

FIG. 7 illustrates a flow chart of example methods for gathering path data, arranged in accordance with at least some embodiments of the present disclosure. In some examples, elements of system 100, mapping plane 500 or scene 600 as shown in FIG. 1, 5 or 6 may be used to illustrate example methods related to the flow chart depicted in FIG. 7. Path manager 180 as shown in FIG. 2 may also be used to illustrate the example methods. But the described methods are not limited to implementations on system 100, mapping plane 500 or scene 600 as shown in FIG. 1, 5 or 6 or to path manager 180 shown in FIG. 2. The example methods may be implemented on other systems having one or more of the elements depicted in FIG. 1, 2, 5 or 6.

Moving from the start to block 710 (Map virtual points), path manager 180 located with either MMORG operator 110 or path operator 120 may include logic and/or features configured to map one or more virtual points (e.g., via map feature 211) on mapping plane 500. In some examples, each of the one or more virtual points may assert a repulsive force upon an object moved from a first area of mapping plane 500 to a second area of mapping plane 500. For these examples, similar to what was mentioned above for mapping plane 300, mapping plane 500 may be a real-world or virtual-world representation.

Continuing from block 710 to block 720 (Incorp. Mapping Plane in Scene), path manager 180 may include logic and/or features configured to incorporate mapping plane 500 in a scene (e.g., via scene feature 213) for an MMORG. For example, mapping plane 500 may be incorporated in scene 600 by decorating point-sets 510A-C to fit one or more aspects of the scene (e.g., forest, village, swamp, etc.).

In some examples, mapping plane 500 may be a virtual-world representation and a portion of mapping plane 500 may be decorated as a virtual-world forest in scene 600. The virtual-world forest may include individual virtual points decorated to represent obstacles or repulsive forces that may slow down or block movement of an object from the first area of mapping plane 500 to the second area of mapping plane 500. These obstacles may include trees, buildings, holes, depressions, bushes, rocks, water, grass, sand or antagonists (e.g., hostile forces). Also, another portion of mapping plane may be decorated to include a building (e.g., a castle) having one or more levels or floors. For this other portion, individual virtual points may be decorated to represent obstacles in the building that may slow down the movement of the object. These obstacles may include walls, floors, ceilings, stairs, furniture or antagonists.

Continuing from block 720 to block 730 (Gather Path Data), path manager 180 may include logic and/or features configured to gather path data (e.g., via gather feature 215) in response to players 130-1 to 130-n of the MMORG moving their respective object through scene 600. In some examples, while scene 600 is visited by players 130-1 to 130-n, each player's path through scene 600 is gathered and at least temporarily stored (e.g., in memory 230).

Continuing from block 730 to decision block 740 (Path Data Threshold Reached?), path manager 180 may include logic and/or features configured to determine if a path data threshold has been reached (e.g., via threshold feature 217). In some examples, the path data threshold may be predetermined amount of path data gathered from players 130-1 to 130-n visiting scene 600 that may be needed or desired to determine one or more minimum repulsive force path(s) (MRFP(s)) through mapping plane 500 decorated to fit scene 600. If a determination is made that a path data threshold has been reached, the process moves to block 750. Otherwise, the process moves back to block 730 to gather more path data.

According to some examples, each player's path through scene 600 may be saved into set Upath$^i$. Where Upath$^i$={$(x_1^i, y_1^i), \ldots (x_n^i, y_n^i)$}, and i is the path order. Also, $(x_1^i, y_1^i)$ are coordinates of a player's entrance position into scene 600 (assuming 2-dimensional mapping plane 500) and $(x_n^i, y_n^i)$ are coordinates of the player's exit position from scene 600. For these examples, according to the coordinates, the position on mapping plane 500 that is passed by individual player objects may be determined. Thus, when a coordinate on mapping plane 500 is passed by a given player's object, a frequency count may be updated (e.g., incremented by a count of 1). For this example, the frequency count may be depicted as Freq$_{(x^1, y^1)}$ to show how a count may be maintained for each coordinate.

Moving from decision block 740 to block 750 (Determine MRFP(s)), path manager 180 may include logic and/or features configured to determine an MRFP through mapping plane 500 (e.g., via determine feature 219). In some examples, the MRFP is determined based on the path data gathered above. For these examples, the MRFP may represent a path that players of the MMORG have collectively shown to be the fastest route to move an object through mapping plane 500 that has been decorated as scene 600.

Continuing from block 750 to decision block 760 (Acceptable MRFP?), path manager 180 may include logic and/or features configured to determine whether an acceptable MRFP has been found (e.g., via determine feature 219). In some examples, a determined MRFP may not be practical or realistically obtainable in a real-world scenario. For example, mapping plane 500 may be a representation of a city layout and the determined MRFP may have a path that runs through private property not available for sale. If the purpose of the mapping plane is to route a public road through the city, the determined MRFP may not be acceptable. If the MRFP is not acceptable, the process moves back to block 710 and the virtual points or obstacles that made the MRFP unacceptable may be added to mapping plane 500. Otherwise, the process comes to an end.

In some examples, scene 600 may be hosted by server(s) 112 of MMORG operator 110. For these examples, logic and/or features of a path manager 180 at MMORG operator may gather the path data and determine the MRFP for mapping plane 500. Alternatively, scene 600 may be hosted by server(s) 122 of path operator 120. For these alternatives, logic and/or features of a path manager 180 at path operator 120 may gather the path data and determine the MRFP for mapping plane 500. In these alternative examples, path operator 120 may work with MMORG operator 110 to provide ways for players of an MMORG hosted by MMORG operator 110 to enter scene 600. These ways may include incentives (e.g., coupons, experience points, virtual-world currency, virtual-world tools/weapons, etc.) for players to choose to enter scene 600. Once a player has moved through scene 600, they may then be routed back to the MMORG hosted by server(s) 112 of MMORG operator 110.

Figure 8:
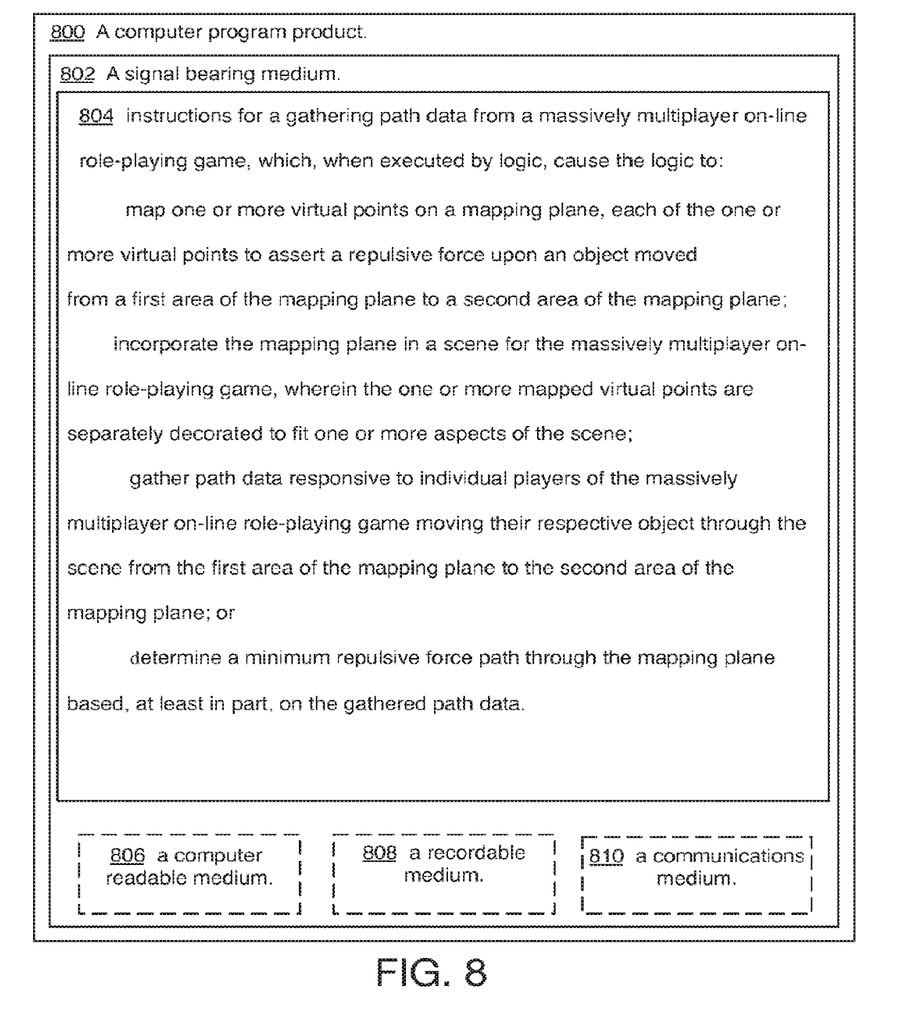
FIG. 8 illustrates a block diagram of an example computer program product.

FIG. 8 illustrates a block diagram of an example computer program product 800, arranged in accordance with at least some embodiments of the present disclosure. In some examples, as shown in FIG. 8, computer program product 800 includes a signal bearing medium 802 that may also include instructions 804 for gathering path data from a massively multiplayer on-line role-playing game. Instructions 804, which, when executed by logic (e.g., path logic 210), may cause the logic to map one or more virtual points on a mapping plane. Each of the one or more virtual points may assert a repulsive force upon an object moved from a first area of the mapping plane to a second area of the mapping plane. The instructions 804 may also cause the logic to incorporate the mapping plane in a scene for the massively multiplayer on-line role-playing game. In some examples, the one or more mapped virtual points are separately decorated to fit one or more aspects of the scene. The instructions 804 may also cause the logic to gather path data responsive to individual players of the massively multiplayer on-line role-playing game moving their respective object through the scene from the first area of the mapping plane to the second area of the mapping plane and determine a minimum repulsive force path through the mapping plane based, at least in part, on the gathered path data.

Also depicted in FIG. 8, in some examples, computer program product 800 may include one or more of a computer readable medium 806, a recordable medium 808 and a communications medium 810. The dotted boxes around these elements depict different types of mediums included within, but not limited to, signal bearing medium 802. These types of mediums may distribute instructions 804 to be executed by logic (e.g., path logic 210). Computer readable medium 806 and recordable medium 808 may include, but are not limited to, a flexible disk, a hard disk drive (HDD), a Compact Disc (CD), a Digital Versatile Disk (DVD), a digital tape, a computer memory, etc. Communications medium 810 may include, but is not limited to, a digital and/or an analog communication medium (e.g., a fiber optic cable, a waveguide, a wired communication link, a wireless communication link, etc.).

Figure 9:
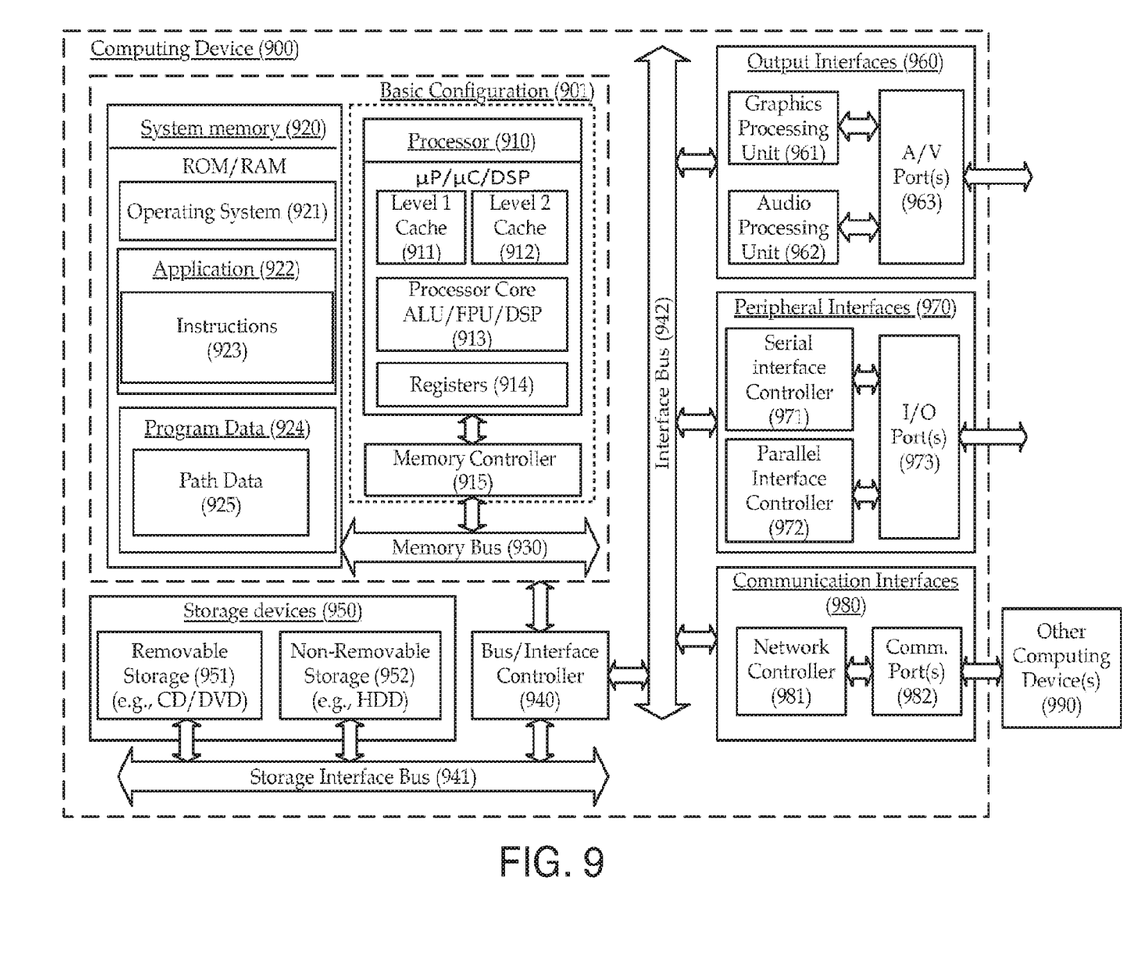
FIG. 9 illustrates an example computing device, all arranged in accordance with at least some embodiments of the present disclosure.

FIG. 9 illustrates an example computing device 900, arranged in accordance with at least some embodiments of the present disclosure. In some examples, path manager 180 depicted in FIG. 1 or 2 may be implemented on computing device 900. In these examples, elements of computing device 900 may be arranged or configured to gather path data from an MMORG and determine a path through a mapping plane that may be a real-world or virtual-world representation. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (µP), a microcontroller (µC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes instructions 923 that are arranged to perform the functions as described herein including the actions described with respect to path manager 180 architecture shown in FIG. 2 or including the actions described with respect to the flow charts shown in FIG. 7. Program Data 924 includes path data 925 that is useful for implementing instructions 923 (e.g., determining a path data threshold or a minimum repulsive force path). In some examples, application 922 can be arranged to operate with program data 924 on an operating system 921 such that implementations for instructions for gathering path data from an MMORG and determining a path through a mapping plane may be provided as described herein. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900 (e.g., baseband representations of signals). Any such computer storage media can be part of computing device 900.

Computing device 900 can also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communications with one or more other computing devices 990 over a network communication via one or more communication ports 982. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A processor-implemented method to determine a path through a scene in a massively multiplayer on-line role-playing game, the method comprising:
    mapping, by the processor, one or more virtual points on a mapping plane, each of the one or more virtual points representing an item in the scene which asserts a repulsive force upon an object moved from a first area of the mapping plane to a second area of the mapping plane;
    incorporating, by the processor, the mapping plane in the scene for the massively multiplayer on-line role-playing game, wherein the one or more mapped virtual points are separately decorated to fit one or more aspects of the scene;
    gathering, by the processor, path data responsive to individual players of the massively multiplayer on-line role-playing game moving their respective object through the scene from the first area of the mapping plane to the second area of the mapping plane;
    storing, in a non-transitory machine-readable memory, at least temporarily, path data for the individual players, the path data for their respective object comprising an array of coordinates which track their respective object's path from an entry point in the scene to an exit point in the scene; and
    determining whether a path data threshold has been reached, wherein the path data threshold represents a minimum amount of path data necessary to determine a minimum repulsive force path through a mapping plane, and in response to a determination that the path data threshold has been reached, determining a minimum repulsive force path through the mapping plane based, at least in part, on the gathered path data.

2. The method of claim 1, wherein determining the minimum repulsive force path comprises determining the minimum repulsive force path once a threshold amount of path data has been gathered.

3. The method of claim 1, wherein the repulsive force exerted on an object by an item varies as a function of a distance between the object and the item, an wherein determining the minimum repulsive force path through the mapping plane comprises determining a path which minimizes a sum of all repulsive forces acting on an object by a plurality of items in the mapping plane.

4. The method of claim 1, wherein the mapping plane is a real-world representation of one of a building layout, a community layout, a city layout, an assembly line layout, a topographical map, a battlefield map, a city street map, a regional freight route map, a national freight route map, an international freight route map, a communication network map or a cloud computing network.

5. The method of claim 4, wherein the mapped virtual points represent items in the real-world that inhibit the movement of the object as the object is moved from a physical location associated with the first area of the mapping plane to another physical location associated with the second area of the mapping plane.

6. The method of claim 1, wherein the mapping plane is a virtual-world representation of one of a building layout, a forest layout, an ocean layout, a desert layout, a mountain layout, a battlefield map, a community layout, a city layout or a city street map.

7. The method of claim 6, wherein the mapped virtual points represent items in the virtual-world that inhibit the movement of the object as the object is moved from a virtual-world location associated with the first area of the mapping plane to another virtual-world location associated with the second area of the mapping plane.

8. The method of claim 1, wherein the scene for the massively multiplayer on-line role-playing game comprises one or more levels of a virtual-world building and the virtual points are separately decorated to represent obstacles to move the object from the first area of the mapping plane to the second area of the mapping plane, the obstacles to include at least one of walls, floors, ceilings, stairs, furniture or antagonists.

9. The method of claim 1, wherein the scene for the massively multiplayer on-line role-playing game comprises a virtual-world forest and the virtual points are separately decorated to represent obstacles to move the object from the first area of the mapping plane to the second area of the mapping plane, the obstacles to include one of trees, buildings, holes, bushes, rocks, water, grass, sand or antagonists.

10. The method of claim 1, wherein the scene for the massively multiplayer on-line role-playing game is hosted by one or more servers that are operated by a different operator than an operator of the massively multiplayer on-line role-playing game.

11. An apparatus configured to determine a path through a scene in a massively multiplayer on-line role-playing game, the apparatus comprising:
    a path manager logic to:
        map one or more virtual points on a mapping plane, each of the one or more virtual points representing an item in the scene which asserts a repulsive force upon an object moved from a first area of the mapping plane to a second area of the mapping plane;
        incorporate the mapping plane in the scene for the massively multiplayer on-line role-playing game, wherein the one or more mapped virtual points are separately decorated to fit one or more aspects of the scene;
        gather path data responsive to individual players of the massively multiplayer on-line role-playing game moving their respective object through the scene from the first area of the mapping plane to the second area of the mapping plane;
        store, in a non-transitory machine-readable memory, at least temporarily, path data for the individual players, the path data for their respective object comprising an array of coordinates which track their respective object's path from an entry point in the scene to an exit point in the scene; and determine whether a path data threshold has been reached, wherein the path data threshold represents a minimum amount of path data necessary to determine a minimum repulsive force path through a mapping plane, and in response to a determination that the path data threshold has been reached determine a minimum repulsive force path through the mapping plane based, at least in part, on the gathered path data.

12. The apparatus of claim 11, wherein the repulsive force exerted on an object by an item varies as a function of a distance between the object and the item, an wherein determining the minimum repulsive force path through the mapping plane comprises determining a path which minimizes a sum of all repulsive forces acting on an object by a plurality of items in the mapping plane.

13. The apparatus of claim 11, wherein the mapping plane is a real- world representation of one of a building layout, a community layout, a city layout, an assembly line layout, a topographical map, a battlefield map, a city street map, a regional freight route map, a national freight route map, an international freight route map, a communication network map or a cloud computing network.

14. The apparatus of claim 13, wherein the mapped virtual points represent items in the real-world that inhibit the movement of the object as the object is moved from a physical location associated with the first area of the mapping plane to another physical location associated with the second area of the mapping plane.

15. The apparatus of claim 11, wherein the logic configured to incorporate the mapping plane in the scene comprises the logic further configured to incorporate the mapping plane by prompting the individual players to at least temporarily leave the massively multiplayer on- line role-playing game in order to move their respective object through the scene, wherein the scene is hosted by one or more servers that are operated by a different operator than the operator of the massively multiplayer on-line role-playing game.

16. A system configured to determine a path through a scene in a massively multiplayer on-line role-playing game, the system comprising:

one or more servers to host the massively multiplayer on-line role-playing game; and a path manager having logic, the logic configured to:
map one or more virtual points on a mapping plane, each of the one or more virtual points representing an item in the scene which asserts a repulsive force upon an object moved from a first area of the mapping plane to a second area of the mapping plane;

incorporate the mapping plane in the scene for the massively multiplayer on-line role-playing game, wherein the one or more mapped virtual points are separately decorated to fit one or more aspects of the scene;

gather path data responsive to individual players of the massively multiplayer on-line role-playing game moving their respective object through the scene from the first area of the mapping plane to the second area of the mapping plane;

store, in a non-transitory machine-readable memory, at least temporarily, path data for the individual players, the path data for their respective object comprising an array of coordinates which track their respective object's path from an entry point in the scene to an exit point in the scene; and determine whether a path data threshold has been reached, wherein the path data threshold represents a minimum amount of path data necessary to determine a minimum repulsive force path through a mapping plane, and in response to a determination that the path data threshold has been reached, determine a minimum repulsive force path through the mapping plane based, at least in part, on the gathered path data.

17. The system of claim 16, wherein the logic configured to determine the minimum repulsive force path comprises the logic further configured to determine the minimum repulsive force path once a threshold amount of path data has been gathered.

18. The system of claim 16, wherein the mapping plane is a virtual- world representation of one of a building layout, a forest layout, an ocean layout, a desert layout, a mountain layout, a battlefield map, a community layout, a city layout or a city street map.

19. The system of claim 18, wherein the mapped virtual points represent items in the virtual-world that inhibit the movement of the object as the object is moved from a virtual-world location associated with the first area of the mapping plane to another virtual-world location associated with the second area of the mapping plane.

20. A computer program product comprising a non-transitory medium having instructions for determining a path through a scene in a massively multiplayer on-line role-playing game, which, when executed by logic, cause the logic to:

map one or more virtual points on a mapping plane, each of the one or more virtual points representing an item in the scene which asserts a repulsive force upon an object moved from a first area of the mapping plane to a second area of the mapping plane;

incorporate the mapping plane in the scene for the massively multiplayer on-line role- playing game, wherein the one or more mapped virtual points are separately decorated to fit one or more aspects of the scene;

gather path data responsive to individual players of the massively multiplayer on-line role-playing game moving their respective object through the scene from the first area of the mapping plane to the second area of the mapping plane;

store, in a non-transitory machine-readable memory, at least temporarily, path data for the individual players, the path data for their respective object comprising an array of coordinates which track their respective object's path from an entry point in the scene to an exit point in the scene; and determine whether a path data threshold has been reached, wherein the path data threshold represents a minimum amount of path data necessary to determine a minimum repulsive force path through a mapping plane, and in response to a determination that a path data threshold has been reached, determine a minimum repulsive force path through the mapping plane based, at least in part, on the gathered path data.

21. The computer program product of claim 20, wherein the instructions to cause the logic to determine the minimum repulsive force path comprises the instructions to further cause the logic to determine the minimum repulsive force path once a threshold amount of path data has been gathered.

22. The computer program product of claim 20, wherein the repulsive force exerted on an object by an item varies as a function of a distance between the object and the item, and wherein determining the minimum repulsive force path through the mapping plane comprises determining a path which minimizes a sum of all repulsive forces acting on an object by a plurality of items in the mapping plane.

* * * * *